United States Patent
Aendekerk et al.

(12) 
(10) Patent No.: US 6,366,027 B1
(45) Date of Patent: Apr. 2, 2002

(54) CIRCUIT DEVICE FOR OPERATING A DISCHARGE LAMP BY MEANS OF A HIGH-FREQUENCY CURRENT

(75) Inventors: Everaard Marie Jozef Aendekerk; Johannes Hendrik Wessels, both of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/713,863

(22) Filed: Nov. 16, 2000

(30) Foreign Application Priority Data

Nov. 19, 1999 (EP) .............................................. 99203873

(51) Int. Cl.[7] .............................................. H05B 37/02
(52) U.S. Cl. ...................... 315/224; 315/219; 315/247; 315/209 R; 315/244; 315/307; 315/DIG. 7
(58) Field of Search .............................. 315/209 R, 219, 315/227 R, 224, 244, 247, 291, 307, 308, DIG. 5, DIG. 7, 205

(56) References Cited

U.S. PATENT DOCUMENTS

| | | | | | |
|---|---|---|---|---|---|
| 4,808,887 | A | * | 2/1989 | Fahnrich et al. ............. | 315/247 |
| 5,396,153 | A | * | 3/1995 | Shackle ....................... | 315/247 |
| 5,404,082 | A | * | 4/1995 | Hernandez et al. ......... | 315/219 |
| 5,757,143 | A | * | 5/1998 | Hernandez Martucci et al. | 315/247 |
| 5,986,408 | A | * | 11/1999 | Langeslag et al. ............ | 315/94 |
| 6,043,606 | A | * | 3/2000 | Arts et al. ..................... | 315/94 |

FOREIGN PATENT DOCUMENTS

WO   WO9719578   5/1997

\* cited by examiner

*Primary Examiner*—Haissa Philogene

(57) ABSTRACT

In a ballast circuit for operating a discharge lamp, two different lamp power levels are adjustable. The ballast circuit is equipped with a switch to optimize the amount of power feedback for the lamp power level. This enables total harmonic distortion and power balance to be optimized for more than one power level.

10 Claims, 2 Drawing Sheets

US 6,366,027 B1

Figure 1:
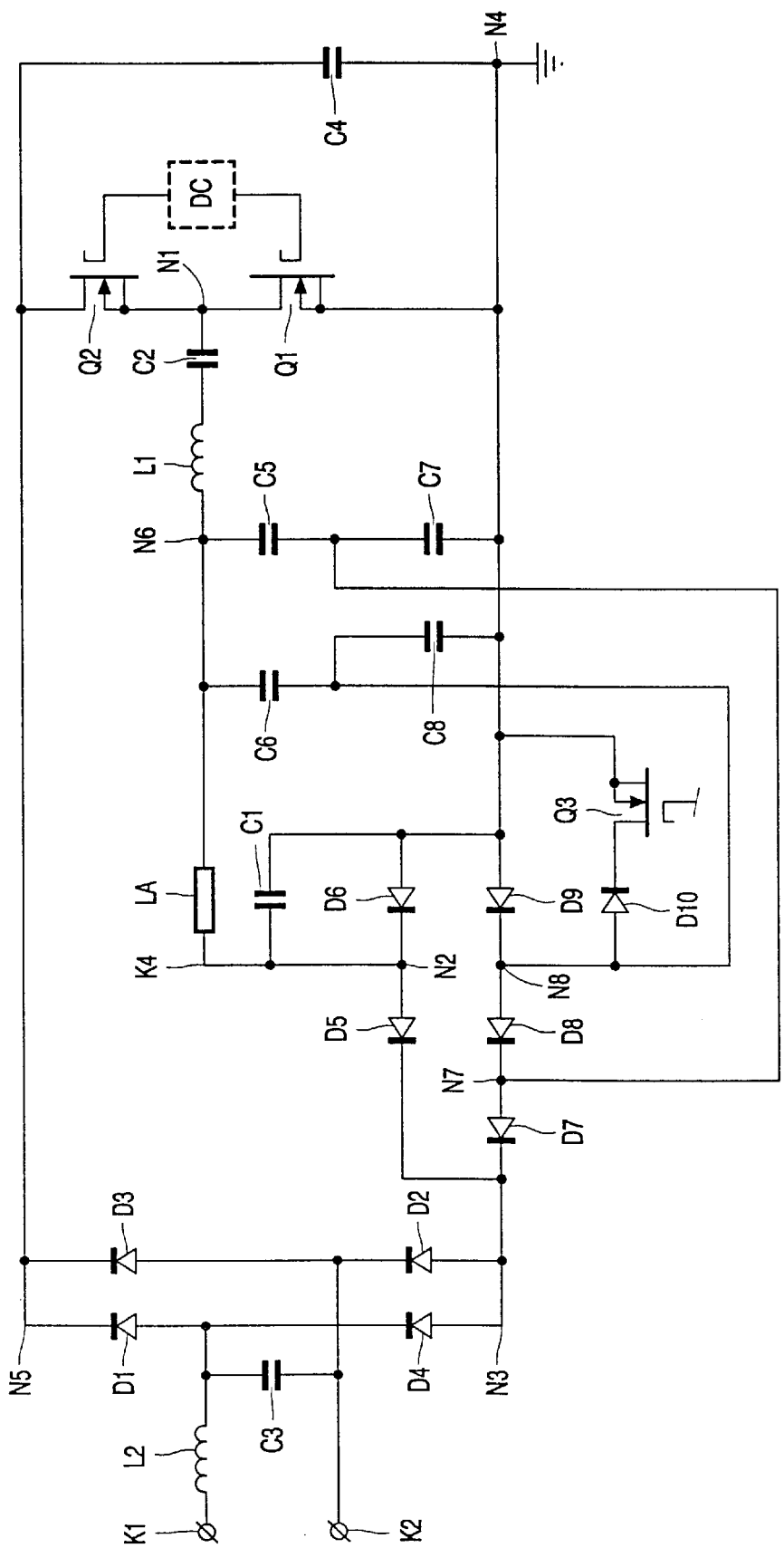

CIRCUIT DEVICE FOR OPERATING A DISCHARGE LAMP BY MEANS OF A HIGH-FREQUENCY CURRENT

BACKGROUND OF THE INVENTION

The invention relates to a circuit device for operating a discharge lamp by means of a high-frequency current, which circuit device comprises input terminals for connecting it to a low-frequency supply-voltage source, rectifier means which are coupled to the input terminals and which are used to rectify the low-frequency supply voltage, a first circuit coupled to a first output terminal N3 of the rectifier means and to a second output terminal N5 of the rectifier means, which first circuit comprises a series arrangement of first unidirectional means, second unidirectional means and first capacitive means, which circuit device further comprises inverter means which are connected in parallel with the first capacitive means and which serve to generate the high-frequency current, a load circuit comprising a series arrangement of inductive means, second capacitive means and means for applying a voltage to the discharge lamp, which load circuit connects a terminal N1 of the inverter means to a terminal N2 between the first unidirectional means and the second unidirectional means, which circuit device further comprises a second circuit connecting a terminal N2 to terminal N5 and comprising third capacitive means, and a third circuit connecting the first output terminal N3 of the rectifier means to a terminal N4 between the second unidirectional means and the first capacitive means and comprising a series arrangement of third unidirectional means and fourth unidirectional means, wherein neither the first circuit nor the third circuit include inductive means, and a fourth circuit connecting the third circuit to a terminal N6, which forms part of the load circuit.

Such a circuit device is disclosed in WO 97/19578.

The known circuit device is dimensioned such that the power feedback circuit is optimized for a certain power level with respect to total harmonic distortion and power balance. This means of course that at a power level which deviates from the predetermined power level, the total harmonic distortion and the power balance are sub-optimal; this is certainly the case, for example, at a difference of 40% in the case of different power levels of 100% and 60%.

SUMMARY OF THE INVENTION

It is an object of the invention to improve the known circuit device in such a manner that optimization with respect to total harmonic distortion and power balance is possible for more than one power level.

To achieve this, the invention provides a circuit device of the type mentioned in the opening paragraph, which is characterized in that the third circuit further comprises fifth unidirectional means interposed between the fourth unidirectional means and terminal N4, terminal N4 is coupled to a terminal N8 between the fourth and the fifth unidirectional means via a series arrangement of sixth unidirectional means and switching means, said sixth unidirectional means being oppositely directed relative to the third, fourth and fifth unidirectional means which are equally directed, and terminal N8 is connected to terminal N6 by means of a fifth circuit.

By virtue of said measures, the circuit device can be selectively adapted to different power levels while maintaining optimum total harmonic distortion and power balance.

It has been found that smooth operation of the circuit device can be achieved if the fifth circuit comprises fifth capacitive means.

In addition, capacitive voltage division enables optimum adaptation to discharge lamps to be used.

Furthermore, the invention enables optimization regarding total harmonic distortion and power balance to be achieved for more than two power levels by embodying a sub-circuit device comprising the fourth, fifth and sixth unidirectional means, the switching means and the fifth circuit so as to form a multiple sub-circuit device. The series connections of fourth and fifth unidirectional means of the multiple sub-circuit device are series-connected between terminals N7 and N4 of the circuit device and have a respective terminal $N8_i$. The series connections of sixth unidirectional means and switching means of the multiple sub-circuit device are connected between the respective terminal $N8_i$ and terminal N4 of the circuit device. The fifth circuits of the multiple sub-circuit device are connected between the respective terminal $N8_i$ and terminal N6 of the circuit device. The fifth and the fourth unidirectional means may then be formed from common unidirectional means.

These and other aspects of the invention will be apparent from and elucidated with reference to the embodiment(s) described hereinafter.

BRIEF DESCRIPTION OF THE INVENTION

Figure 2:
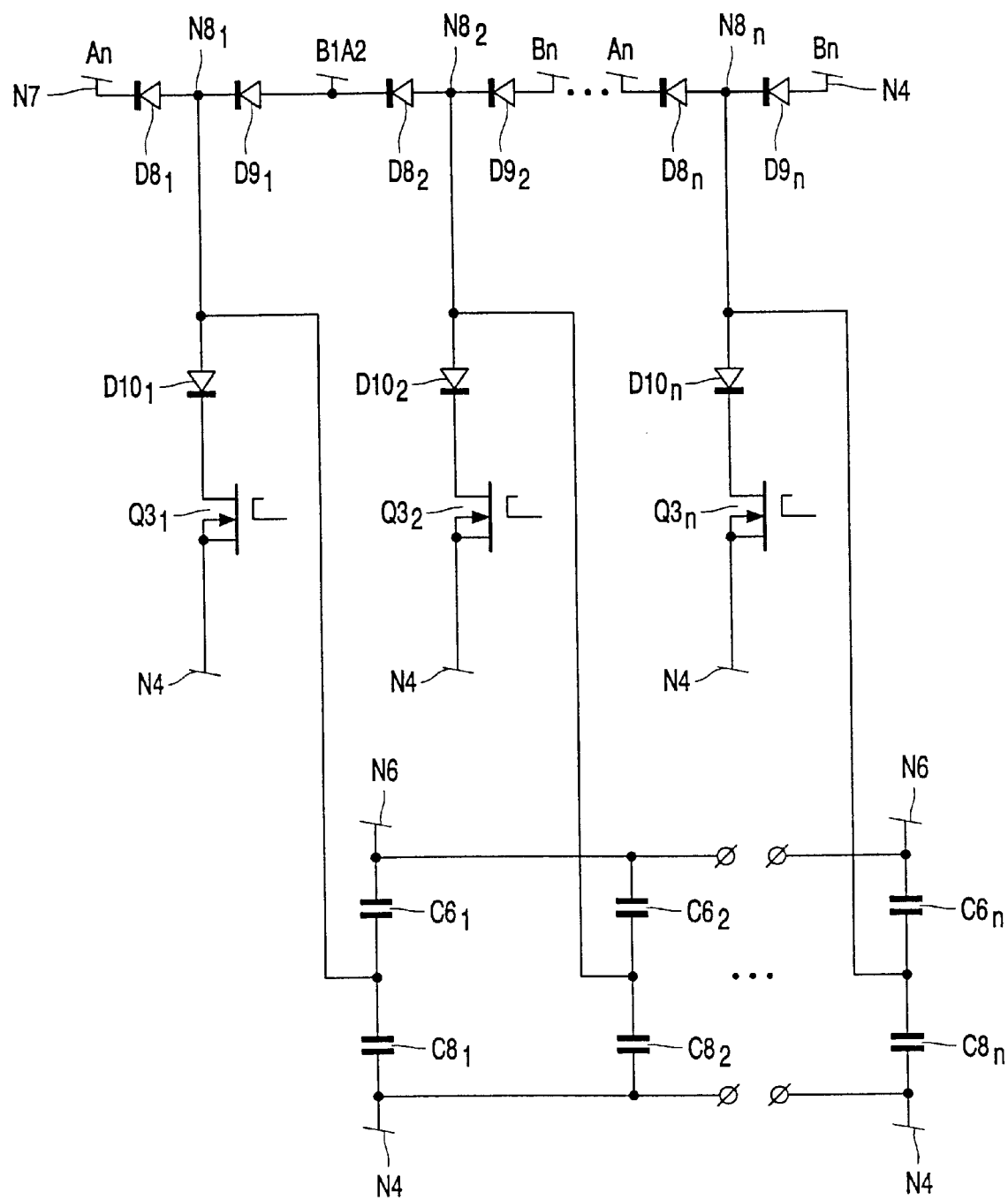

In the drawings:

FIG. 1 is a simplified diagram of the embodiment of a circuit device in accordance with the invention, wherein a discharge lamp LA is connected to the circuit device; and FIG. 2 shows the multiple sub-circuit device.

DESCRIPTION OF THE PREFERRED EMBODIMENT

In FIG. 1, K1 and K2 are input terminals for connecting the circuit device to a low-frequency supply-voltage source. L2 is an inductor which forms an input filter in combination with a capacitor C3. Diodes D1–D4 are rectifier means for rectifying the low-frequency supply voltage. Diodes D5 and D6 form, respectively, first and second unidirectional means. A capacitor C4 forms first capacitive means and, in combination with diodes D5 and D6, a first circuit. Switching elements Q1 and Q2 form inverter means in combination with a drive circuit DC. The drive circuit DC is a circuit part for generating drive signals for rendering the switching elements Q1 and Q2 conducting and non-conducting. Inductor L1, capacitor C2 and terminals K3 and K4 for connecting a discharge lamp jointly form a load circuit. Inductor L1 forms inductive means, capacitor C2 forms second capacitive means, and terminals K3 and K4 for connecting a discharge lamp form means for applying a voltage to the discharge lamp. Capacitor C1 forms third capacitive means. Capacitor C1 and capacitor C4 jointly form a second circuit. Diodes D7 and D8 form third and fourth unidirectional means, respectively. The series arrangement of diodes D7 and D8 forms a third circuit. Capacitor CS forms fourth capacitive means as well as a fourth circuit.

Input terminals K1 and K2 are connected to each other by means of a series arrangement of inductor L2 and capacitor C3. A first side of capacitor C3 is connected to a first input terminal of the rectifier bridge, and a second side of capacitor C3 is connected to a second input terminal of the rectifier bridge. A first output terminal N3 of the rectifier bridge is connected to a second output terminal N5 of the rectifier bridge by means of a series arrangement of diode D5, diode D6 and capacitor C4. N2 is a common terminal of diode D5 and diode D6. N4 is a common terminal of diode D6 and capacitor C4. Terminal N2 is connected to terminal N4 by means of capacitor C1. A series arrangement of diodes D7 and D8 is connected in parallel with the series arrangement of diodes D5 and D6. N7 is a common terminal of diodes D7 and D8. A series arrangement of switching elements Q1 and Q2 is connected in parallel with capacitor C4. A control electrode of switching element Q1 is connected to a first output terminal of drive circuit DC. A control electrode of switching element Q2 is connected to a second output terminal of drive circuit DC. N1 is a common terminal of switching element Q1 and switching element Q2. Terminal N1 is connected to terminal N2 by means of a series arrangement of, respectively, capacitor C2, inductor L1, terminal K3, discharge lamp LA and terminal K4. N6 is a common terminal of inductor L1 and terminal K3. Terminal N6 is connected to terminal N7 by means of capacitor C5.

If diode D8 is directly connected to terminal N4, then the operation of the hitherto described part of the circuit device shown in FIG. 1 is as follows.

If input terminals K1 and K2 are connected to the poles of a low-frequency supply-voltage source, then the rectifier bridge rectifies the low-frequency supply-voltage supplied by this source, so that a DC voltage is present across capacitor C4 serving as a buffer capacitor. The drive circuit DC renders the switching elements Q1 and Q2 alternately conducting and non-conducting, as a result of which a substantially square-wave voltage having an amplitude which is substantially equal to the amplitude of the DC voltage across capacitor C4 is present on terminal N1. The substantially square-wave voltage present on terminal N1 causes an alternating current to flow through inductor L1 and capacitor C2. A first part of this alternating current flows through terminals K3 and K4, the discharge lamp LA and terminal N2. The remaining part of this alternating current flows through capacitor C5 and terminal N7. As a result, voltages of the same frequency as the substantially square-wave voltage are present on terminal N2 and terminal N7. These voltages on terminal N2 and terminal N7 make sure that a pulsating current is drawn from the supply-voltage source, also when the voltage across capacitor C4 is higher than the instantaneous amplitude of the rectified low-frequency supply voltage. For this reason, the power factor of the circuit device has a comparatively high value and the total harmonic distortion of the supply current is comparatively low.

It is not be noted that similar results were achieved for a configuration of the circuit device which differs somewhat from the configuration shown in FIG. 1 in that capacitor C1 connects terminal N2 to terminal N5 instead of to terminal N4. In this slightly different configuration, capacitor C1 forms third capacitive means and a second circuit.

So far, the circuit device and the operation thereof are conventional and known from WO 97/19578.

As opposed to the known circuit device, the inventive circuit device additionally comprises a diode D9 in the third circuit, as shown in FIG. 1, which diode is interposed between diode D8 and terminal N4. Diode D9 forms fifth unidirectional means. Furthermore, terminal N4 is connected to a terminal N8 between the diodes D8 and D9 by means of a series arrangement of a diode D10 and a switching element Q3. Diode D10 and switching element Q3 form, respectively, sixth unidirectional means and switching means. Diode D10, which is accommodated in the circuit, is oppositely poled relative to the equally poled diodes D7–D9. Finally, terminals N6 and N8 are connected to each other by means of capacitor C6. Capacitor C6 forms a fifth circuit and fifth capacitive means. If necessary, or desirable, terminals N4 and N7 can be connected to each other by capacitor C7. Capacitor C7 forms a sixth circuit and sixth capacitive means. Capacitors C5 and C7 form a capacitive voltage divider. As regards capacitor C6, a similar capacitive voltage division can be obtained by connecting terminals N4 and N8 to each other by means of a capacitor C8. Capacitor C8 forms a seventh circuit and seventh capacitive means.

Switching element Q3 and diode D10 jointly short-circuit diode D9 when the switching element Q3 is in the conducting state, so that the circuit device of FIG. 1 works in the same conventional way as the known circuit device.

When the switching element Q3 is not conducting, then diode D9 is active. Diode D9 co-operates with capacitor C6 in the same conventional way as diode D8 in combination with capacitor C5. The selective addition of diode D9 and capacitor C6 to the circuit device by means of circuit element Q3 and diode D10 enables the total harmonic distortion and power balance to be optimized for two power levels, for example for a 100% power level and a 60% power level when reduced lighting suffices, resulting, in the latter case, in a saving of energy at a satisfactory stability. In other words, two power feedback circuits are used, each of which is optimized with respect to the total harmonic distortion and power balance for one power level, and the appropriate power feedback path for optimum total harmonic distortion and power balance can be chosen. As a result, a ballast is obtained which meets the requirements in terms of a fixed output power at both output levels. Capacitive division can be applied for fine tuning the discharge lamp to be used, in particular to preclude vertical or horizontal power-supply thresholds (?) at high lamp voltages.

As shown in FIG. 2, use is made of a multiple sub-circuit device comprising the fourth, fifth and sixth unidirectional means (D8–D10, FIG. 1), the switching means (Q3, FIG. 1) and the fifth circuit (C6, in FIG. 1), the series connections of fourth and fifth unidirectional means $D8_1$, $D9_1$; $D8_2$, $D9_2$; ...; $D8_N$, $D9_N$ of the multiple sub-circuit device being series-connected between terminals N7 and N4 of the circuit device and comprising a respective terminal $N8_i$, which is indicated in FIG. 2 by, respectively, $N8_1$, $N8_2$, ..., $N8_N$. The series connections of sixth unidirectional means and switching means $D10_1$, $Q3_1$; $D10_2$, $Q3_2$; ...; $D10_N$, $Q3_N$ of the multiple sub-circuit device are connected between the respective terminals $N8_1$, $N8_2$, ..., $N8_N$ and terminal N4 of the circuit device. The fifth circuits $C6_1$, $C6_2$, ..., C6N of the multiple sub-circuit device are connected between the respective terminals $N8_1$, $N8_2$, ..., $N8_N$ and terminal N6 of the circuit device.

As is also shown in FIG. 2, the multiple sub-circuit device may also comprise the seventh circuit (C8, FIG. 1). The seventh circuits $C8_1$, $C8_2$, ..., $C8_N$, if present, are connected between the respective terminals $N8_1$, $N8_2$, ..., $N8_N$ and terminal N4 of the circuit device.

The fifth and fourth unidirectional means of two successive sub-circuit devices, for example $D9_1$, $D8_2$ and $D9_2$, $D8_3$ in the case of a triple sub-circuit device, may be formed of common unidirectional means. For example, of two series-arranged diodes, one can be omitted.

What is claimed is:

1. A circuit device for operating a discharge lamp by means of a high-frequency current, which circuit device comprises input terminals for connecting it to a low-frequency supply-voltage source, rectifier means which are coupled to the input terminals and which are used to rectify the low-frequency supply voltage, a first circuit coupled to a first output terminal N3 of the rectifier means and to a second output terminal N5 of the rectifier means, which first circuit comprises a series arrangement of first unidirectional means, second unidirectional means and first capacitive means, which circuit device further comprises inverter means which are connected in parallel with the first capacitive means and which serve to generate the high-frequency current, a load circuit comprising a series arrangement of inductive means, second capacitive means and means for applying a voltage to the discharge lamp, which load circuit connects a terminal N1 of the inverter means to a terminal N2 between the first unidirectional means and the second unidirectional means, which circuit device further comprises a second circuit connecting a terminal N2 to terminal N5 and comprising third capacitive means, and a third circuit connecting the first output terminal N3 of the rectifier means to a terminal N4 between the second unidirectional means and the first capacitive means and comprising a series arrangement of third unidirectional means and fourth unidirectional means, wherein neither the first circuit nor the third circuit include inductive means, and a fourth circuit connecting a terminal N7 between the third unidirectional means and the fourth unidirectional means to a terminal N6, which forms part of the load circuit, characterized in that the third circuit further comprises fifth unidirectional means interposed between the fourth unidirectional means and terminal N4, terminal N4 is coupled to a terminal N8 between the fourth and the fifth unidirectional means via a series arrangement of sixth unidirectional means and switching means, said sixth unidirectional means being oppositely directed relative to the third, fourth and fifth unidirectional means which are equally directed, and terminal N8 is connected to terminal N6 by means of a fifth circuit.

2. A circuit device as claimed in claim 1, characterized in that a sub-circuit device comprising the fourth, fifth and sixth unidirectional means, the switching means and the fifth circuit is embodied so as to be a multiple sub-circuit device, wherein the series connections of fourth and fifth unidirectional means of the multiple sub-circuit device are series-connected between terminals N7 and N4 and have a respective terminal $N8_i$, the series connections of sixth unidirectional means and switching means of the multiple sub-circuit device are connected between the respective terminal $N8_i$ and terminal N4, and the fifth circuits of the multiple sub-circuit device are connected between the respective terminal $N8_i$ and terminal N6.

3. A circuit device as claimed in claim 2, characterized in that the fifth and fourth unidirectional means of two successive sub-circuit devices are formed from common unidirectional means.

4. A circuit device as claimed in claim 1, characterized in that terminal N8 is connected to terminal N4 by means of a seventh circuit.

5. A circuit device as claimed in claim 2, characterized in that the multiple sub-circuit device also comprises the seventh circuit, said seventh circuits of the multiple sub-circuit device being connected between the respective terminal $N8_i$ and terminal N4.

6. A circuit device as claimed in claim 1, characterized in that terminal N7 is connected to terminal N4 by means of a sixth circuit.

7. A circuit device as claimed in claim 1, wherein the fifth circuit comprises fifth capacitive means.

8. A circuit device as claimed in claim 6, characterized in that the sixth circuit comprises sixth capacitive means.

9. A circuit device as claimed in claim 4, characterized in that the seventh circuit comprises seventh capacitive means.

10. A circuit device as claimed in claim 1, characterized in that the inverter means comprise a series arrangement of a first switching element, terminal N1 and a second switching element, as well as a drive circuit DC which is coupled to the switching elements and which serves to generate a drive signal for rendering the switching elements alternately conducting and non-conducting.

\* \* \* \* \*